United States Patent
Kim et al.

(10) Patent No.: US 9,515,431 B2
(45) Date of Patent: Dec. 6, 2016

(54) DEVICE FOR CONNECTING BATTERY MODULE ELECTRODE TERMINAL AND TERMINAL

(71) Applicant: SK Innovation Co., Ltd., Seoul (KR)

(72) Inventors: Sangyeon Kim, Yongin-si (KR); Yun Nyoung Lee, Gwangmyeong-si (KR)

(73) Assignee: SK Innovation Co., Ltd., Seoul (KR)

( * ) Notice: Subject to any disclaimer, the term of this patent is extended or adjusted under 35 U.S.C. 154(b) by 0 days.

(21) Appl. No.: 14/416,136

(22) PCT Filed: Jun. 14, 2013

(86) PCT No.: PCT/KR2013/005276
§ 371 (c)(1),
(2) Date: Jan. 21, 2015

(87) PCT Pub. No.: WO2014/017744
PCT Pub. Date: Jan. 30, 2014

(65) Prior Publication Data
US 2015/0222060 A1  Aug. 6, 2015

(30) Foreign Application Priority Data

Jul. 23, 2012 (KR) .................. 10-2012-0079769

(51) Int. Cl.
*H01R 24/00* (2011.01)
*H01R 24/38* (2011.01)
(Continued)

(52) U.S. Cl.
CPC ............ *H01R 24/38* (2013.01); *H01M 2/202* (2013.01); *H01M 2/30* (2013.01); *H01M 2/305* (2013.01); *H01R 11/281* (2013.01); *H01R 13/187* (2013.01); *H01R 13/20* (2013.01); *H01R 13/501* (2013.01)

(58) Field of Classification Search
CPC ........ H01R 24/38; H01M 2/26; H01M 2/30; H01M 2/305
USPC ........ 439/675, 759, 855, 843, 846, 848, 879
See application file for complete search history.

(56) References Cited

U.S. PATENT DOCUMENTS

| 1,854,489 | A | | 4/1932 | Sebell | |
| 5,135,403 | A | * | 8/1992 | Rinaldi | ............... H01R 12/585 439/82 |

(Continued)

FOREIGN PATENT DOCUMENTS

| CN | 101682017 A | 3/2010 |
| EP | 0896389 A1 | 2/1999 |

(Continued)

*Primary Examiner* — Tulsidas C Patel
*Assistant Examiner* — Peter G Leigh
(74) *Attorney, Agent, or Firm* — The Webb Law Firm

(57) ABSTRACT

Provided is an apparatus for connecting between an electrode terminal of a battery module and a terminal capable of electrically connecting the electrode terminal and the terminal to each other by being press-fitted onto an outer side of the electrode terminal protruding outwardly of the battery module. The apparatus for connecting between an electrode terminal of a battery module and a terminal includes a socket terminal inserted and closely adhered onto the outer side of the electrode terminal and a socket coupled and closely adhered onto an outer side of the socket terminal and coupled to the terminal, such that the electrode terminal and the terminal are electrically connected to each other by the socket terminal and the socket.

15 Claims, 9 Drawing Sheets

(51) Int. Cl.
*H01M 2/30* (2006.01)
*H01R 11/28* (2006.01)
*H01M 2/20* (2006.01)
*H01R 13/187* (2006.01)
*H01R 13/20* (2006.01)
*H01R 13/50* (2006.01)

(56) References Cited

U.S. PATENT DOCUMENTS

| | | | | |
|---|---|---|---|---|
| 5,456,611 A | * | 10/1995 | Henry | H01R 13/6395 439/180 |
| 5,486,123 A | * | 1/1996 | Miyazaki | H01R 13/15 439/825 |
| 5,562,506 A | * | 10/1996 | Wright | H01R 24/50 439/578 |
| 5,672,442 A | | 9/1997 | Burnett | |
| 5,730,628 A | * | 3/1998 | Hawkins | A61N 1/3752 439/843 |
| 5,913,694 A | * | 6/1999 | Wright | H01R 9/053 439/394 |
| 6,042,432 A | * | 3/2000 | Hashizawa | H01R 13/187 439/843 |
| 6,250,974 B1 | * | 6/2001 | Kerek | H01R 13/187 439/843 |
| 6,341,990 B1 | | 1/2002 | Fukuda | |
| 6,478,634 B2 | | 11/2002 | Fukuda | |
| 6,966,796 B2 | * | 11/2005 | Abe | H01R 13/04 439/585 |
| 7,204,720 B1 | * | 4/2007 | Shiu | H01R 13/502 439/668 |
| 7,549,889 B2 | * | 6/2009 | Sikora | H01R 11/286 439/388 |
| 7,794,265 B2 | * | 9/2010 | Sikora | H01R 11/286 439/388 |
| 7,842,416 B2 | * | 11/2010 | Kim | H01M 2/06 429/163 |
| 8,597,065 B2 | * | 12/2013 | Mounier | H01R 13/187 439/843 |
| 2002/0050382 A1 | * | 5/2002 | Kosuge | H01R 11/284 174/66 |
| 2004/0132335 A1 | * | 7/2004 | Kosuge | H01R 13/68 439/522 |
| 2004/0161980 A1 | * | 8/2004 | Cret | H01R 11/282 439/759 |
| 2010/0248007 A1 | | 9/2010 | Kwon et al. | |
| 2015/0171401 A1 | | 6/2015 | Kim et al. | |

FOREIGN PATENT DOCUMENTS

| | | |
|---|---|---|
| EP | 2871695 A1 | 5/2015 |
| JP | 200250341 A | 2/2002 |
| JP | 200256838 A | 2/2002 |
| JP | 2006190565 A | 7/2006 |
| KR | 1020010103329 A | 11/2001 |

* cited by examiner

DEVICE FOR CONNECTING BATTERY MODULE ELECTRODE TERMINAL AND TERMINAL

CROSS-REFERENCE TO RELATED APPLICATIONS

This application is the United States national phase of International Application No. PCT/KR2013/005276 filed Jun. 14, 2013, and claims priority to Korean Patent Application No. 10-2012-0079769 filed Jul. 23, 2012, the disclosures of which are hereby incorporated in their entirety by reference.

TECHNICAL FIELD

The present invention relates to an apparatus for connecting between an electrode terminal of a battery module and a terminal capable of connecting the electrode terminal of the battery module and the terminal coupled to a power cable of an external device to each other.

BACKGROUND ART

Generally, since a secondary battery may be charged and discharged unlike a primary battery, the secondary battery has been applied to various fields such as a digital camera, a cellular phone, a laptop computer, and a hybrid vehicle and has been actively studied. An example of the secondary battery includes a nickel-cadmium battery, a nickel-metal hydride battery, a nickel-hydrogen battery, and a lithium secondary battery. In addition, among these secondary batteries, the lithium secondary battery having a high energy density and a discharging voltage has been mainly studied, and has been commercialized and widely used.

Further, the secondary battery is configured in a form of a battery module in which a plurality of battery cells are stacked due to the necessity of a high output and a large capacity, wherein the battery module includes an electrode terminal formed so as to protrude outwardly, such that it may be connected to a power cable of an external device.

Here, the electrode terminal of the battery module has a screw thread formed on an outer peripheral surface thereof, and the power cable of the external device has a terminal coupled thereto. The terminal is inserted onto an outer side of the electrode terminal and is connected to the electrode terminal in a scheme of fixing the terminal using a nut.

However, in the above-mentioned configuration and scheme, since a tool capable of tightening the nut should be inserted when the battery module is installed in a specific space or a plurality of battery modules are stacked to configure a battery pack, a sufficient space should be secured. In addition, a specific torque should be applied in order to tighten the nut, and disassembling and assembling are difficult at the time of performing a check due to occurrence of abnormality.

As the related art, European Patent Publication Application No. 0,896,389 entitled "Improved Battery Terminal" has been disclosed.

RELATED ART DOCUMENT

Patent Document

EP 0896389 A1 (1999.02.10.)

DISCLOSURE

Technical Problem

An object of the present invention is to provide an apparatus for connecting between an electrode terminal of a battery module and a terminal capable of simply connecting the electrode terminal protruding outwardly of the battery module and the terminal coupled to a power cable of an external device to each other in a press-fitting scheme.

Technical Solution

In one general aspect, an apparatus for connecting between an electrode terminal of a battery module and a terminal includes: a socket terminal having a plurality of elastic contactors extendedly formed at one side of a cylindrical body thereof so as to be spaced apart from each other by a predetermined distance in a circumferential direction and inserted onto and closely adhered to an outer side of the electrode terminal protruding from one side of the battery module; and a socket enclosing an outer side of the socket terminal and coupled to the socket terminal so as to be closely adhered thereto and having the terminal coupled to one side thereof, wherein the electrode terminal and the terminal are electrically connected to each other by the socket terminal and the socket.

The socket terminal may have bent parts formed by bending portions of the elastic contactors in a length direction toward the center, and the bent parts of the elastic contactors may be closely adhered to an outer peripheral surface of the electrode terminal.

The electrode terminal may have a protruding end formed on the outer peripheral surface thereof, and the socket terminal may be inserted onto and coupled to the electrode terminal so that the bent parts of the elastic contactor are caught by the protruding end.

The socket may have hooking protrusions protruding on an inner peripheral surface thereof, and the socket terminal may have a plurality of coupling holes formed in the body thereof, the hooking protrusions being inserted into and fixed to the coupling holes.

The socket may have jaws formed on an inner peripheral surface thereof at an opposite side to a side at which the socket is inserted onto the electrode terminal, the jaws having an inner diameter smaller than an outer diameter of the body of the socket terminal.

The socket terminal may have rotation preventing grooves formed at one side of the body thereof, the rotation preventing grooves having the jaws inserted and seated thereinto.

The socket may have a vertical plate formed at one side of a cylindrical body thereof enclosing the outer side of the socket terminal and closely adhered to the outer side of the socket terminal, and the terminal may be closely adhered and coupled to the vertical plate.

The apparatus for connecting between an electrode terminal of a battery module and a terminal may further include a case coupled to the battery module to accommodate the socket, the socket terminal, and the terminal coupled to the electrode terminal therein and closely adhering the socket and the socket terminal to the electrode terminal in a direction in which the socket and the socket terminal are inserted onto the electrode terminal.

Sliding guides and a hooking jaw may be formed on a partition wall formed in the battery module, and a sliding groove corresponding to the sliding guides and an elastic hook hooked and fixed to the hooking jaw may be formed in the case.

One side of an elastic plate of the elastic hook may be fixed to the case and the other side thereof may be extended in an opposite direction to a direction in which the case is coupled to the battery module to thereby be longer than the case and the partition wall, and the elastic plate may have a protrusion part formed thereon to thereby be hooked and fixed to the hooking jaw of the partition wall.

The case may have a fixing protrusion protruding at an inner side thereof, and the terminal may have a cut part formed therein so as to correspond to the fixing protrusion, such that the terminal is closely adhered and fixed by the fixing protrusion.

Advantageous Effects

In the apparatus for connecting between an electrode terminal of a battery module and a terminal, the electrode terminal of the battery module and the terminal coupled to the power cable may be connected to each other in the press-fitting scheme, such that a separate tool for electrically connecting the electrode terminal and the terminal to each other is not required, and connection is conveniently made.

In addition, the number of processes for connecting the electrode terminal and the terminal to each other and a time required for these processes may be decreased, and disassembling and assembling are simple, such that maintenance is easy.

In addition, quality problems such as a problem that a nut becomes loose, a contact defect, and the like, due to insufficiency of a fastening torque that may occur in a nut fastening scheme may be solved.

[Detailed Description of Main Elements]

1000: apparatus for connecting between electrode
terminal of battery module and terminal
100: battery module
110: electrode terminal     111: protruding end
120: partition wall     121: sliding guide

[Detailed Description of Main Elements]

| | |
|---|---|
| 122: hooking jaw | |
| 200: socket terminal | |
| 210: body | 211: coupling hole |
| 212: rotation preventing groove | |
| 220: elastic contactor | 221: bent part |
| 300: socket | |
| 310: body | 311: hooking protrusion |
| 312: jaw | 320: vertical plate |
| 400: terminal | |
| 410: hollow plate | 411: cut part |
| 420: cable coupled part | |
| 500: case | |
| 510: case body | 511: sliding groove |
| 512: fixing protrusion | |
| 520: elastic hook | 521: elastic plate |
| 522: protrusion part | |
| 530: cover | 540: fixing ring |
| 2000: battery pack | |

BEST MODE

Hereinafter, an apparatus for connecting between an electrode terminal of a battery module and a terminal according to an exemplary embodiment of the present invention will be described in detail with reference to the accompanying drawings.

Figure 1:
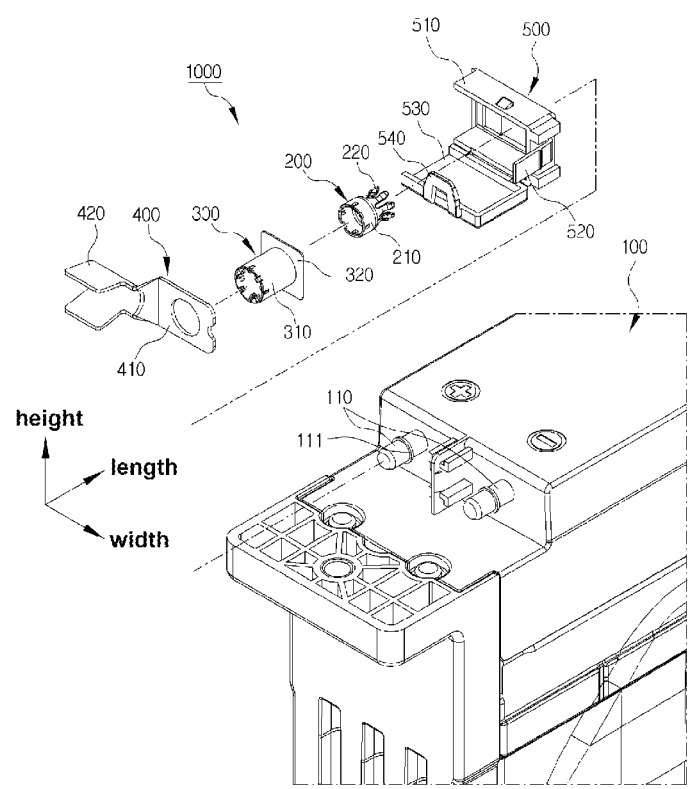
FIGS. 1 and 2 are an exploded perspective view and an assembled perspective view showing an apparatus for connecting between an electrode terminal of a battery module and a terminal according to an exemplary embodiment of the present invention.
Figure 2:
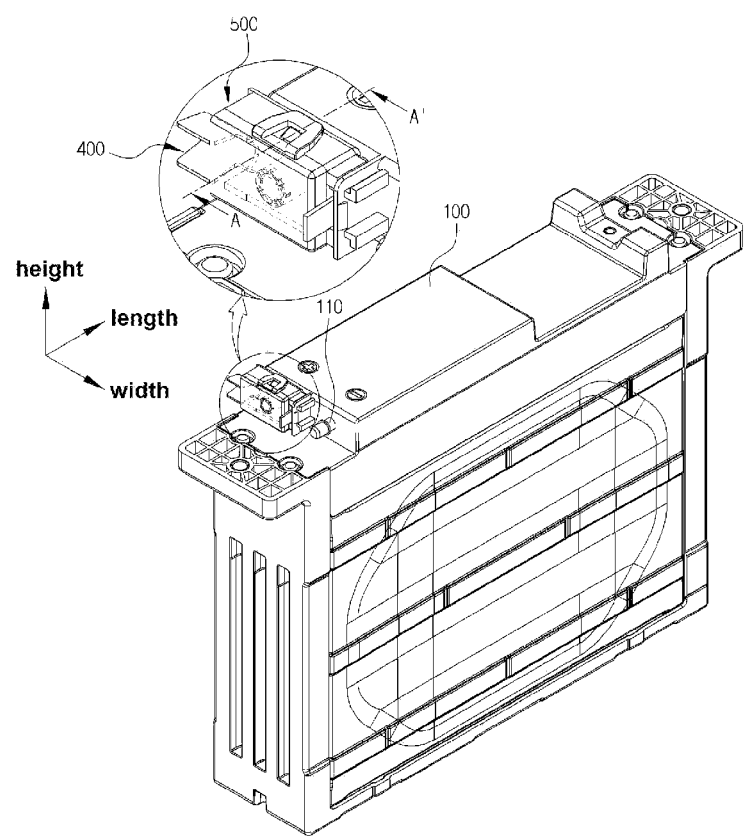

FIGS. 1 and 2 are an exploded perspective view and an assembled perspective view showing an apparatus for connecting between an electrode terminal of a battery module and a terminal according to an exemplary embodiment of the present invention.

As shown, an apparatus 1000 for connecting between an electrode terminal of a battery module and a terminal according to an exemplary embodiment of the present invention is configured to include a socket terminal 200 having a plurality of elastic contactors 220 extendedly formed at one side of a cylindrical body 210 thereof so as to be spaced apart from each other by a predetermined distance in a circumferential direction and inserted onto and closely adhered to an outer side of the electrode terminal 110 protruding from one side of the battery module 100; and a socket 300 enclosing an outer side of the socket terminal 200 and coupled to the socket terminal 200 so as to be closely adhered thereto and having the terminal 400 coupled to one side thereof, wherein the electrode terminal 110 and the terminal 400 are electrically connected to each other by the socket terminal 200 and the socket 300.

First, the battery module 100 includes a plurality of battery cells stacked therein and electrically connected to each other, and has the electrode terminals 110 protruding from one side thereof. Here, the electrode terminals 110 may include a positive electrode terminal and a negative electrode terminal spaced apart from each other by a predetermined distance and formed in parallel with each other as shown in FIG. 1, and may be formed at various positions such as a side surface of the battery module 100 in a length direction, an upper surface of the battery module 100, or the like.

The socket terminal 200 has the plurality of elastic contactors 220 formed at one side of the cylindrical body 210, wherein the elastic contactors 220 are formed so as to be spaced apart from each other by a predetermined distance in the circumferential direction of the body 210. Here, the cylindrical body 210 has an inner diameter larger than an outer diameter of the electrode terminal 110, such that the socket terminal 200 may be easily inserted onto the outer side of the electrode terminal 110. In addition, the elastic contactors 220 are formed in a form in which they are bent toward a central axis of the cylindrical body 210, such that an inner diameter formed by the plurality of elastic contactors 220 is smaller than the outer diameter of the electrode terminal 110. Therefore, when the socket terminal 200 is inserted onto and coupled to the outer side of the electrode terminal 110, the elastic contactors 220 of the socket terminal 200 are closely adhered to the electrode terminal 110.

The socket 300 may be inserted onto and be closely adhered and coupled to an outer side of the socket terminal 200, and be formed in a cylindrical shape so as to enclose the outer side of the socket terminal 200. In addition, the socket 300 may have the terminal 400 coupled to one side thereof, wherein the terminal 400 may be fixed and electrically connected to the socket 300 by welding.

Here, the terminal 400 has a cable coupled part 420 formed at one side of a hollow plate 410 of which an inner portion is hollow, wherein the hollow plate 410 may be inserted onto and coupled to an outer side of the socket 300 and a power cable connected to an external device may be coupled to the cable coupled part 420.

In a state in which the socket terminal 200 is inserted and coupled into the socket 300 as described above, an assembly of the socket 300 and the socket terminal 200 is inserted onto and is closely adhered and coupled to the outer side of the electrode terminal 110, and the terminal 400 is inserted into and welded to the outer side of the socket 300, such that the electrode terminal 110 of the battery module 100 and the terminal 400 may be electrically connected to each other.

Therefore, in the apparatus for connecting between an electrode terminal of a battery module and a terminal according to an exemplary embodiment of the present invention, the electrode terminal of the battery module and the terminal may be connected in a press-fitting scheme by the elastic contactors of the socket terminal inserted and coupled into the socket, such that a separate tool for electrically connecting between the electrode terminal and the terminal is not required, and connection is conveniently made. In addition, the number of processes for connecting the electrode terminal and the terminal to each other and a time required for these processes may be decreased, and disassembling and assembling are simple, such that maintenance is easy. In addition, quality problems such as a problem that a nut becomes loose, a contact defect, and the like, due to insufficiency of a fastening torque that may occur in a nut fastening scheme may be solved.

Figure 4:
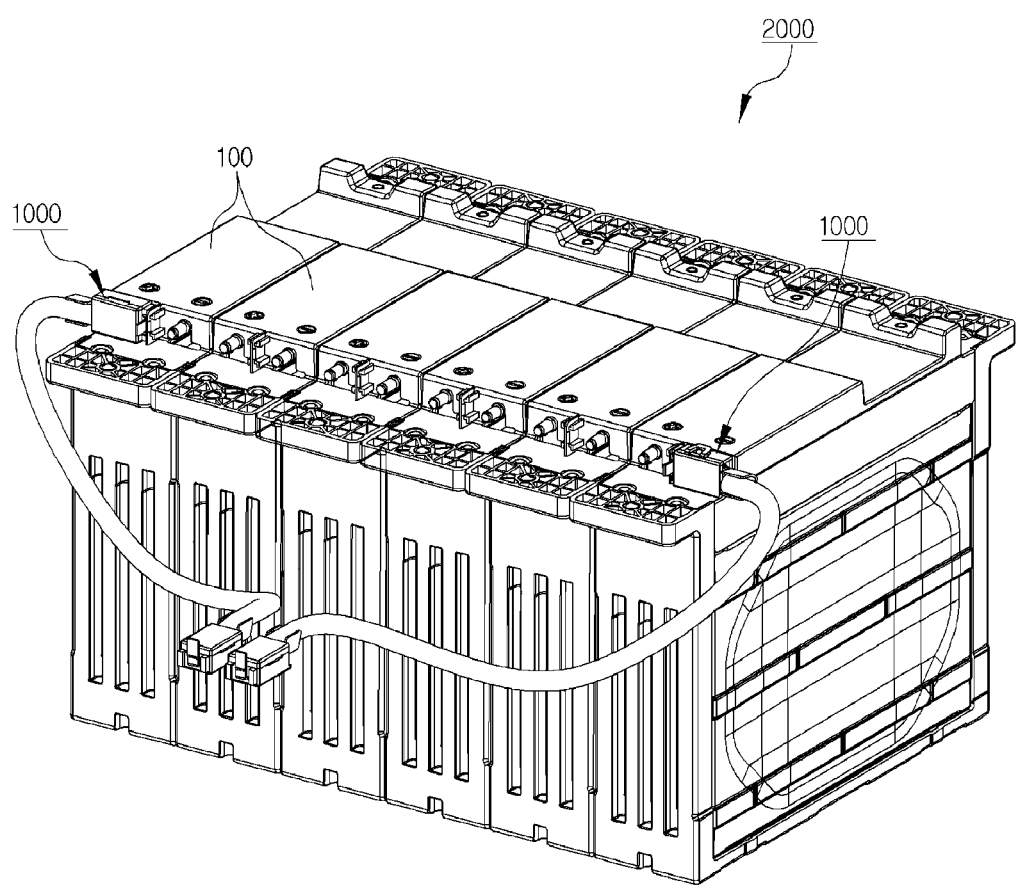
FIG. 4 is a perspective view showing a battery pack including a plurality of battery modules according to an exemplary embodiment of the present invention.

In addition, as shown in FIG. 4, after a plurality of battery modules 100 are stacked and positive electrode terminals and negative electrode terminals of adjacent battery modules 100 are connected to each other by bus bars, or the like, to form a battery pack 2000, power cables of an external device may be connected to a positive electrode terminal and a negative electrode terminal of battery modules 100 disposed at the outermost portion using the apparatus 1000 for connecting between an electrode terminal of a battery module and a terminal according to an exemplary embodiment of the present invention.

In addition, the socket terminal 200 may have bent parts 221 formed by bending portions of the elastic contactors 220 in the length direction toward the center, and the bent parts 221 of the elastic contactors 220 may be closely adhered to an outer peripheral surface of the electrode terminal 110.

Figure 3:
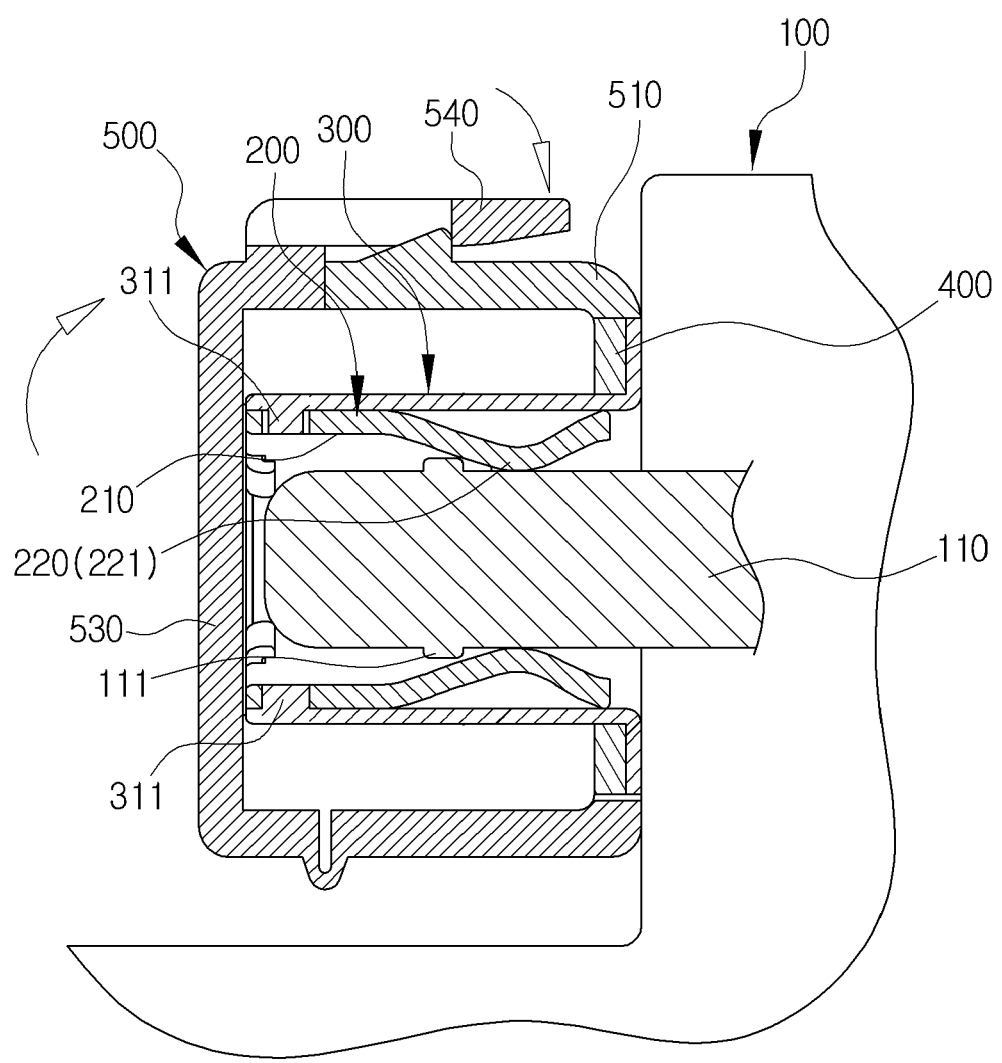
FIG. 3 is a cross-sectional view taken along line A-A' of FIG. 2.

That is, as shown in FIG. 3, one sides of the elastic contactors 220 are coupled to the body 210 of the socket terminal 200, portions of the elastic contactors 220 in the length direction extendedly formed are bent toward the central axis of the cylindrical body 210, such that the bent parts 221 are formed, and the other sides (free ends) of the elastic contactors 220, which are an opposite side to a side at which the elastic contactors 220 are coupled to the body 210, are bent toward an outer side of the central axis of the body 210. Here, an inner diameter formed by the bent parts 221 of the plurality of elastic contactors 220 is smaller than the outer diameter of the electrode terminal 110, such that the bent parts 221 of the elastic contactors 220 may be closely adhered and coupled to an outer peripheral surface of the electrode terminal 110 by press-fitting.

Therefore, when the socket terminal 200 is press-fitted onto the outer side of the electrode terminal 110 in a state in which the socket terminal 200 is inserted and coupled into the socket 300, the body 210 of the socket terminal 200 and the other sides (free ends) of the elastic contactors 220 of the socket terminal 200 are closely adhered to an inner peripheral surface of the socket 300, and the bent parts 221 are closely adhered to the outer peripheral surface of the electrode terminal 110, such that electrical connection may be stabilized.

Here, the electrode terminal 110 has a protruding end 111 formed on the outer peripheral surface thereof, and the socket terminal 200 may be inserted onto and coupled to the electrode terminal 110 so that the bent parts 221 of the elastic contactor 220 are caught by the protruding end 111.

That is, when the socket terminal 200 coupled into the socket 300 is inserted onto the outer side of the electrode terminal 110, the bent parts 221 of the elastic contactors 220 override the protruding end 111 of the electrode terminal 110, are spread, and then return to their original state by elasticity. Therefore, since the bent parts 221 of the elastic contactors 220 are caught by the protruding end 111 formed on the outer peripheral surface of the electrode terminal 110 after the socket terminal 200 is coupled to the electrode terminal 110, the socket terminal 200 may not be easily withdrawn in an opposite direction to a direction in which it is inserted.

In addition, the electrode terminal 110 may be generally formed in a cylindrical shape or a prismatic shape, and may have a screw thread formed on the outer peripheral surface thereof. However, it is preferable that the electrode terminal 110 is smoothly formed so that a contact area between the electrode terminal 110 and the elastic contactors 220 of the socket terminal 200 may be increased for the purpose of a smooth flow of a conduction current. In addition, in order to prevent electric conduction and separation, the electrode terminal 110 may also be formed in a shape in which the outer peripheral surface thereof is depressed so as to correspond to shapes of the bent parts 221 of the elastic contactors 220 of the socket terminal 200, such that the bent parts 221 are seated onto and are closely adhered and coupled to the depressed portion of the electrode terminal 110.

In addition, the socket 300 has hooking protrusions 311 protruding on the inner peripheral surface thereof, and the socket terminal 200 has a plurality of coupling holes 211 formed in the body 210 thereof, wherein the hooking protrusions 311 may be inserted into and fixed to the coupling holes 211. That is, since movement of the socket 300 and the socket terminal 200 in the length direction in which the socket 300 and the socket terminal 200 are coupled and inserted is prevented by the hooking protrusions 311 inserted into the coupling holes 211, the elastic contactors 220 of the socket terminal 200 may be certainly closely adhered to the outer peripheral surface of the electrode terminal 110.

Figure 5:
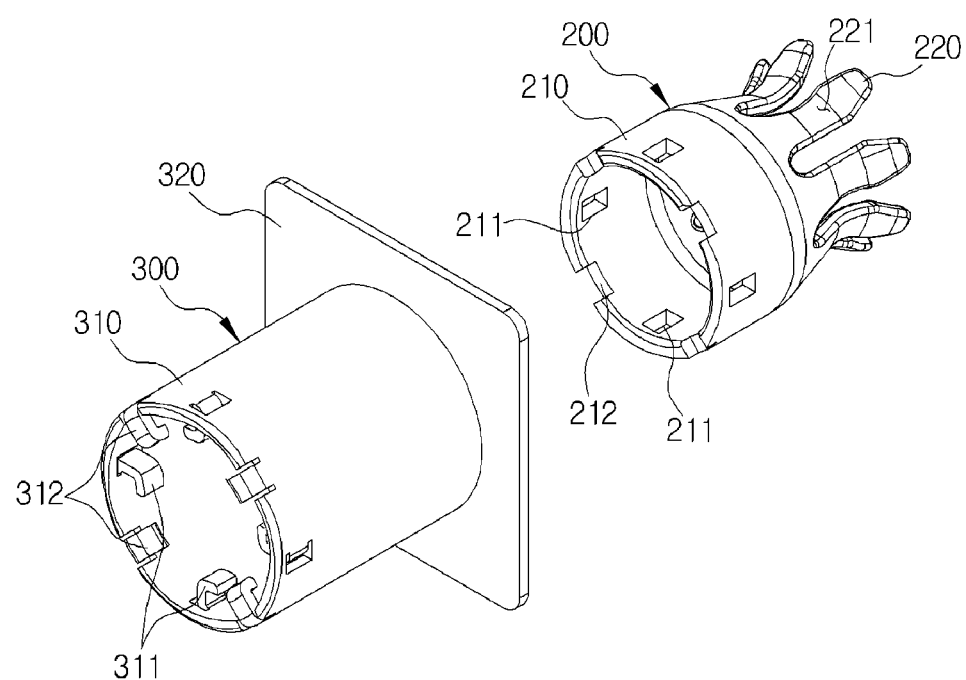
FIGS. 5 and 6 are an exploded perspective view and an assembled perspective view showing a coupled structure between a socket and a socket terminal according to an exemplary embodiment of the present invention.
Figure 6:
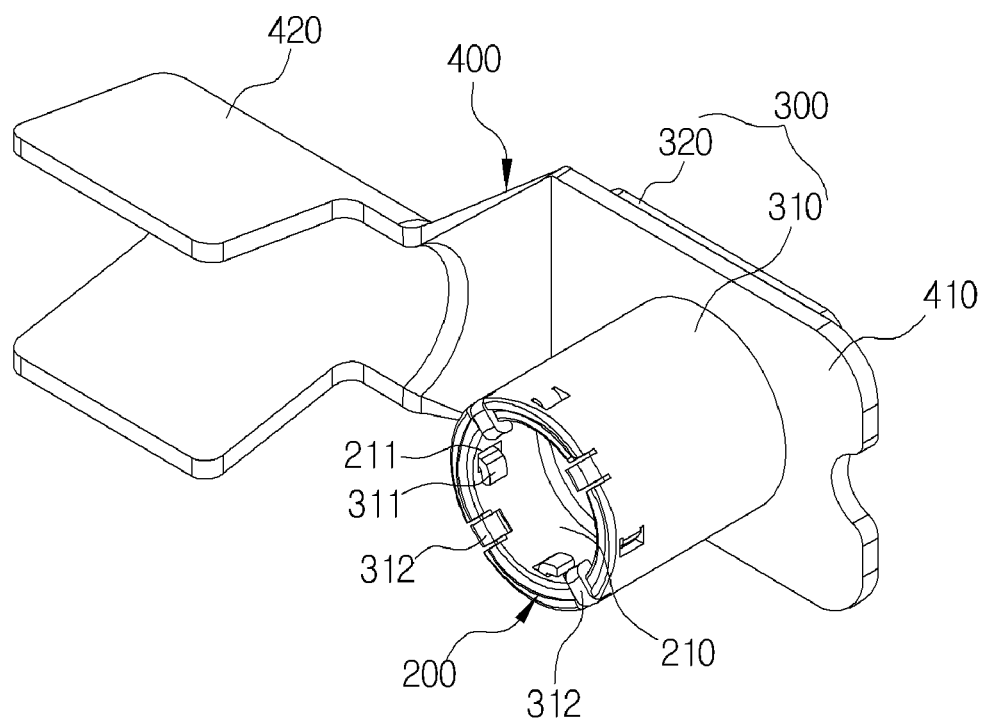

In addition, the socket 300 may have jaws 312 formed on the inner peripheral surface thereof at an opposite side to a side at which it is inserted onto the electrode terminal 110, wherein the jaws 312 have an inner diameter smaller than an outer diameter of the body 210 of the socket terminal 200. Therefore, in a state in which the socket terminal 200 is inserted and coupled into the socket 300, the socket 300 has the jaws 312 formed at the opposite side to the side at which it is inserted onto the electrode terminal 110, such that the socket terminal 200 may be press-fitted onto the outer side of the electrode terminal 110 without being pushed out. Here, as shown in FIGS. 5 and 6, a plurality of jaws 312 may be formed in a shape in which they protrude from one side of the body 310 of the socket 300 toward the central axis, and be formed in a disk shape in which central portions thereof are empty.

In addition, the socket terminal 200 has rotation preventing grooves 212 formed at one side of the body 210 thereof, wherein the rotation preventing grooves 212 have the jaws 312 inserted and seated thereinto. That is, the jaws 312 are seated into the rotation preventing grooves 212 in a state in which the socket terminal 200 and the socket 300 are coupled to each other, such that rotation of the socket 300 in the circumferential direction is prevented, thereby making it possible to prevent separation between the socket 300 and the socket terminal 200.

In addition, the socket 300 may have a vertical plate 320 formed at one side of a cylindrical body 310 thereof enclosing the outer side of the socket terminal 200 and closely adhered to the outer side of the socket terminal 200, and the terminal 400 may be closely adhered and coupled to the vertical plate 320. That is, when the vertical plate 320 is formed at one side of the cylindrical body 310 of the socket 300, the terminal 400 may be closely adhered and be then welded to the vertical plate 320, such that coupling and electrical connection may be facilitated.

In addition, the apparatus 1000 for connecting between an electrode terminal of a battery module and a terminal according to an exemplary embodiment of the present invention may further include a case 500 coupled to the battery module 100 to accommodate the socket 300, the socket terminal 200, and the terminal 400 coupled to the electrode terminal 110 therein and closely adhering the socket 300 and the socket terminal 200 to the electrode terminal 110 in the direction in which the socket 300 and the socket terminal 200 are inserted onto the electrode terminal 110. That is, the case 500 may be fixed to the battery module 100, as shown in FIG. 2, to protect the electrode terminal 110, the socket terminal 200, the socket 300, and the terminal 400, and a cover 530 of the case 500 may closely adhere the socket terminal 200 and the socket 300 to the electrode terminal 110 in the direction in which the socket terminal 200 and the socket 300 are inserted onto the electrode terminal 110, as shown in FIG. 3, to prevent the socket terminal 200 and the socket 300 from being separated from the electrode terminal 110. Here, the case 500 includes the cover 530 hinge-coupled to opened one side of a case body 510 of which both sides are opened and a fixing ring 540 hinge-coupled to the cover 530, wherein the cover 530 is closed and the fixing ring 540 is hooked and fixed to fixing protrusions formed on the case body 510.

Figure 7:
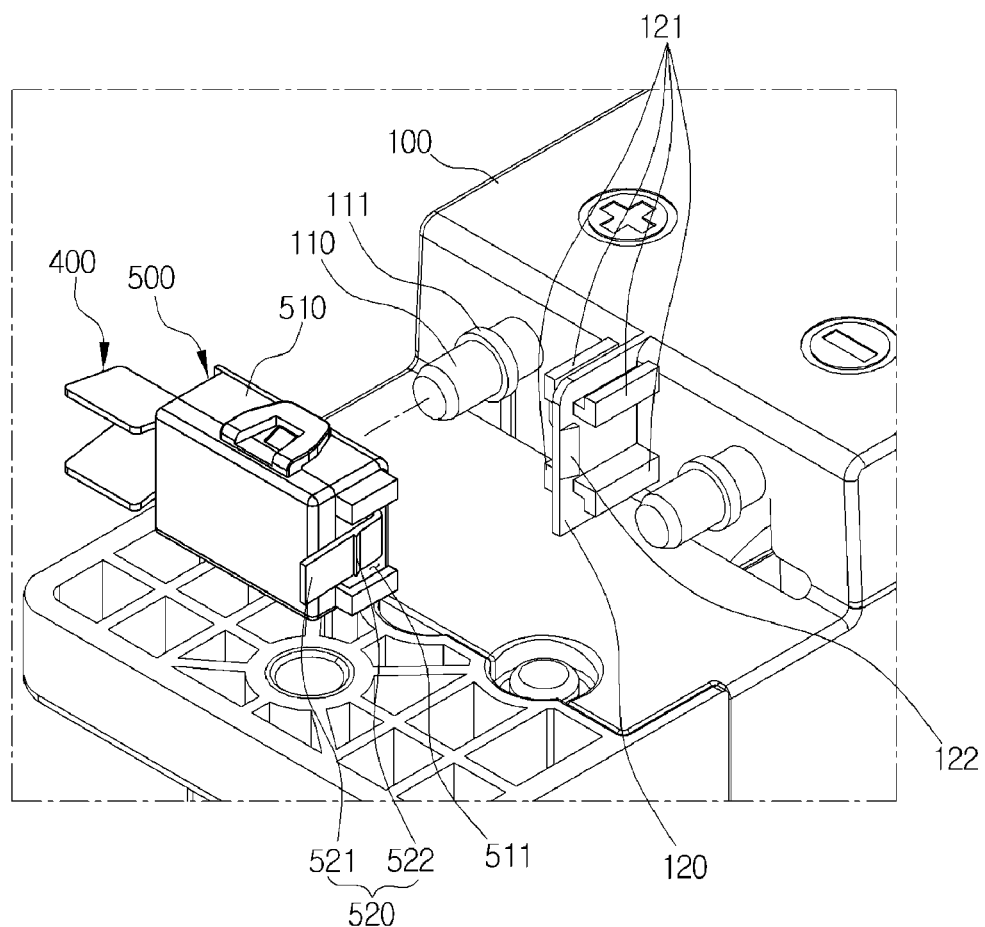
FIGS. 7 and 8 are an exploded perspective view and an assembled perspective view showing a coupled structure between a battery module and a case according to an exemplary embodiment of the present invention.
Figure 8:
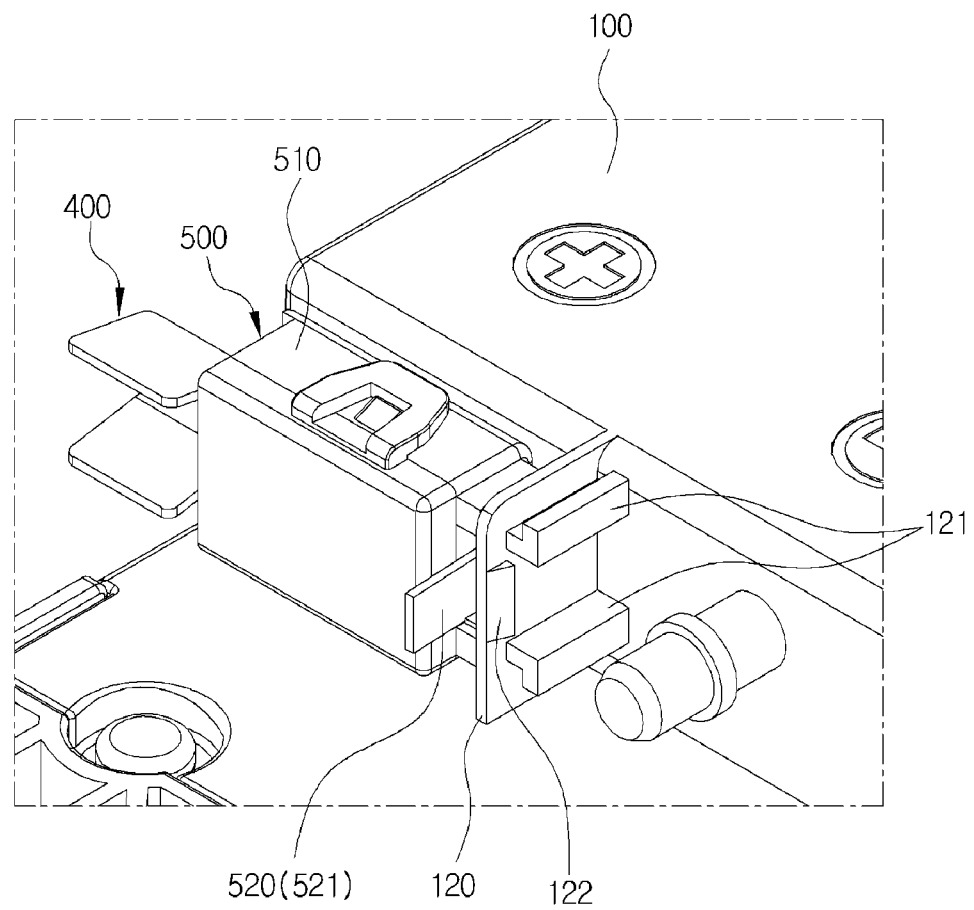

In addition, sliding guides 121 and a hooking jaw 122 may be formed on a partition wall 120 formed in the battery module 100, and a sliding groove 511 corresponding to the sliding guides 121 and an elastic hook 520 hooked and fixed to the hooking jaw 122 may be formed in the case 500. That is, as shown in FIGS. 7 and 8, in a state in which the sliding guides 121 are inserted along the sliding grooves 511 formed at a side surface of the case body 510, such that one side of the case body 510 is closely adhered to the battery modules 100, the case body 510 is fixed by the elastic hooks 520 and the hooking jaws 122, such that it is not withdrawn backward. Here, the partition wall 120 of the battery module 100 may be formed between a pair of electrode terminals 110 spaced apart from each other by a predetermined distance, and the sliding guides 121 formed at one side of the partition wall 120 may be formed in pairs at upper and lower portions so as to be symmetrical to each other and prevent separation of the case body 510. In addition, the partition wall 120 may have the hooking jaw 122 formed between the pair of sliding guides 121 so that the elastic hook 520 is hooked thereto.

Further, one side of an elastic plate 521 of the elastic hook 520 is fixed to the case and the other side thereof is extended in an opposite direction to a direction in which the case 500 is coupled to the battery module 100 to thereby be longer than the case 500 and the partition wall 120, and the elastic plate 521 has a protrusion part 522 formed thereon to thereby be hooked and fixed to the hooking jaw 122 of the partition wall 120. This is to easily disassemble the case 500, one side of the elastic plate 521 is coupled to a side surface of the case body 510, that is, a side close to the battery module 100, and the other side of the elastic plate 521 is lengthily extended to an opposite side so as to be longer than the case 500 in the length direction, and the protrusion part 522 is formed on the elastic plate 521. Therefore, in the case in which the case 500 is coupled to the battery module 100, when the case 500 is inserted along the sliding guides 121, the case 500 is inserted while the elastic plate 521 is pressed, and the protrusion part 522 is hooked to the hooking jaw 122 in a state in which the case 500 is closely adhered to the battery module 100. On the other hand, in the case in which the case 500 is separated from the battery module 100, when the other end of the elastic plate 521 that protrudes is pulled toward the case, fixing is released, such that the case may be disassembled along the sliding guides.

In addition, since the case 500 has a terminal withdrawal part formed so that an opposite side surface thereof in a width direction to a side surface on which the case body 510 thereof is coupled to the partition wall 120 of the battery module 100 is partially opened, the terminal 400 may be coupled to the case 500 so that the cable coupled part 420 protrudes outwardly of the case 500, such that it may be connected to the power cable connected to the external device.

Figure 9:
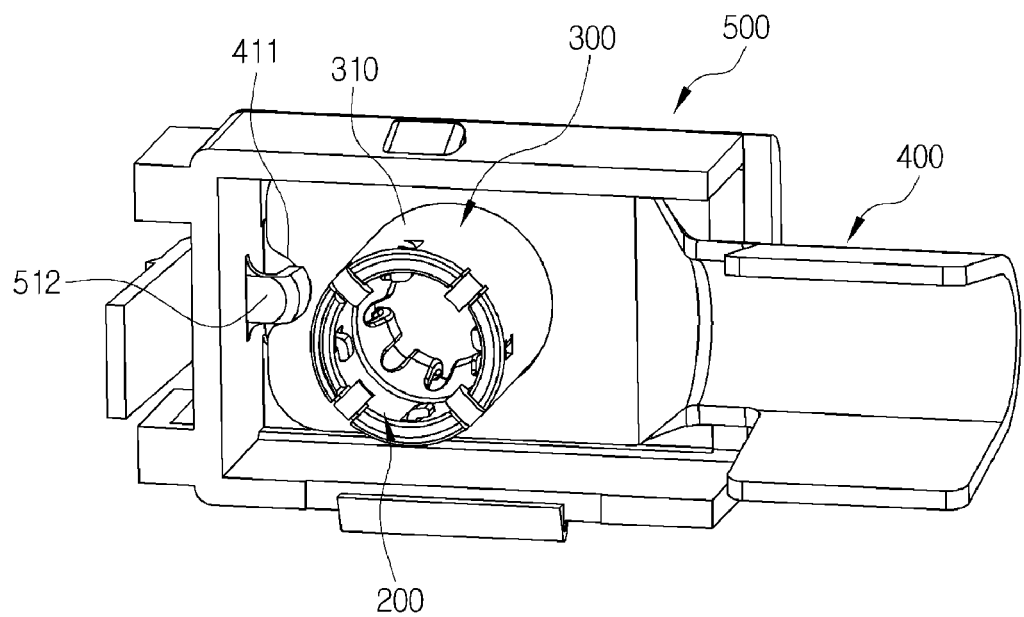
FIG. 9 is a perspective view showing a fixing structure of a case and a terminal according to an exemplary embodiment of the present invention.

In addition, the case 500 has a fixing protrusion 512 protruding at an inner side thereof, and the terminal 400 has a cut part 411 formed therein so as to correspond to the fixing protrusion 512, such that the terminal 400 may be closely adhered and fixed by the fixing protrusion 512. Referring to FIG. 9, when the socket terminal 200, the socket 300, and the terminal 400 are coupled to each other and are then inserted into the outer side of the electrode terminal 110 in a state in which the case 500 is coupled to the battery module 100, terminal 400 is closely adhered to the battery module 100 by the fixing protrusion 512 after the cut part 411 of the terminal 400 is press-fitted while being slid along the fixing protrusion 512. Therefore, it is possible to prevent the terminal 400, the socket 300, and the socket terminal 200 from being separated in an opposite direction to a direction in which the terminal 400, the socket 300, and the socket terminal 200 are inserted onto the electrode terminal 110, by the fixing protrusion 512 formed at the inner side of the case 500. Here, the fixing protrusion 512 may be formed in a '┐' shape on an inner side wall of the case 500, and an outer side of a bent portion of the fixing protrusion 512 may be formed in an inclined shape or a round shape so that the cut part 411 of the terminal 400 is easily slid when being press-fitted.

The present invention is not limited to the above-mentioned exemplary embodiments but may be variously applied, and may be variously modified by those skilled in the art to which the present invention pertains without departing from the gist of the present invention claimed in the claims.

The invention claimed is:

1. An apparatus for connecting between an electrode terminal of a battery module and a terminal comprising:
- a socket terminal having a plurality of elastic contactors extendedly formed at one side of a cylindrical body thereof so as to be spaced apart from each other by a predetermined distance in a circumferential direction and inserted onto and closely adhered to an outer side of the electrode terminal protruding from one side of the battery module; and
- a socket enclosing an outer side of the socket terminal and coupled to the socket terminal so as to be closely adhered thereto and having the terminal coupled to one side thereof,
- wherein the electrode terminal and the terminal are electrically connected to each other by the socket terminal and the socket, and
- wherein the socket has hooking protrusions protruding on an inner peripheral surface thereof, and the socket terminal has a plurality of coupling holes formed in the body thereof, the hooking protrusions being inserted into and fixed to the coupling holes.

2. The apparatus for connecting between an electrode terminal of a battery module and a terminal of claim 1, wherein the socket terminal has bent parts formed by bending portions of the elastic contactors in a length direction toward the center, and the bent parts of the elastic contactors are closely adhered to an outer peripheral surface of the electrode terminal.

3. The apparatus for connecting between an electrode terminal of a battery module and a terminal of claim 2, wherein the electrode terminal has a protruding end formed on the outer peripheral surface thereof, and the socket terminal is inserted onto and coupled to the electrode terminal so that the bent parts of the elastic contactor are caught by the protruding end.

4. The apparatus for connecting between an electrode terminal of a battery module and a terminal of claim 1, wherein the socket has jaws formed on an inner peripheral surface thereof at an opposite side to a side at which the socket is inserted onto the electrode terminal, the jaws having an inner diameter smaller than an outer diameter of the body of the socket terminal.

5. The apparatus for connecting between an electrode terminal of a battery module and a terminal of claim 4, wherein the socket terminal has rotation preventing grooves formed at one side of the body thereof, the rotation preventing grooves having the jaws inserted and seated thereinto.

6. The apparatus for connecting between an electrode terminal of a battery module and a terminal of claim 1, wherein the socket has a vertical plate formed at one side of a cylindrical body thereof enclosing the outer side of the socket terminal and closely adhered to the outer side of the socket terminal, and the terminal is closely adhered and coupled to the vertical plate.

7. The apparatus for connecting between an electrode terminal of a battery module and a terminal of claim 1, further comprising a case coupled to the battery module to accommodate the socket, the socket terminal, and the terminal coupled to the electrode terminal therein and closely adhering the socket and the socket terminal to the electrode terminal in a direction in which the socket and the socket terminal are inserted onto the electrode terminal.

8. The apparatus for connecting between an electrode terminal of a battery module and a terminal of claim 7, wherein sliding guides and a hooking jaw are formed on a partition wall formed in the battery module, and a sliding groove corresponding to the sliding guides and an elastic hook hooked and fixed to the hooking jaw are formed in the case.

9. The apparatus for connecting between an electrode terminal of a battery module and a terminal of claim 8, wherein one side of an elastic plate of the elastic hook is fixed to the case and the other side thereof is extended in an opposite direction to a direction in which the case is coupled to the battery module to thereby be longer than the case and the partition wall, and the elastic plate has a protrusion part formed thereon to thereby be hooked and fixed to the hooking jaw of the partition wall.

10. The apparatus for connecting between an electrode terminal of a battery module and a terminal of claim 7, wherein the case has a fixing protrusion protruding at an inner side thereof, and the terminal has a cut part formed therein so as to correspond to the fixing protrusion, such that the terminal is closely adhered and fixed by the fixing protrusion.

11. An apparatus for connecting between an electrode terminal of a battery module and a terminal comprising:
- a socket terminal having a plurality of elastic contactors extendedly formed at one side of a cylindrical body thereof so as to be spaced apart from each other by a predetermined distance in a circumferential direction and inserted onto and closely adhered to an outer side of the electrode terminal protruding from one side of the battery module; and
- a socket enclosing an outer side of the socket terminal and coupled to the socket terminal so as to be closely adhered thereto and having the terminal coupled to one side thereof,
- wherein the electrode terminal and the terminal are electrically connected to each other by the socket terminal and the socket, and
- wherein the socket has jaws formed on an inner peripheral surface thereof at an opposite side to a side at which the socket is inserted onto the electrode terminal, the jaws having an inner diameter smaller than an outer diameter of the body of the socket terminal.

12. The apparatus for connecting between an electrode terminal of a battery module and a terminal of claim 11, wherein the socket terminal has rotation preventing grooves formed at one side of the body thereof, the rotation preventing grooves having the jaws inserted and seated thereinto.

13. An apparatus for connecting between an electrode terminal of a battery module and a terminal comprising:
- a socket terminal having a plurality of elastic contactors extendedly formed at one side of a cylindrical body thereof so as to be spaced apart from each other by a predetermined distance in a circumferential direction and inserted onto and closely adhered to an outer side of the electrode terminal protruding from one side of the battery module;
- a socket enclosing an outer side of the socket terminal and coupled to the socket terminal so as to be closely adhered thereto and having the terminal coupled to one side thereof; and a case coupled to the battery module to accommodate the socket, the socket terminal, and the terminal coupled to the electrode terminal therein and closely adhering the socket and the socket terminal to the electrode terminal in a direction in which the socket and the socket terminal are inserted onto the electrode terminal, wherein the electrode terminal and the terminal are electrically connected to each other by the socket terminal and the socket, and wherein sliding guides and a hooking jaw are formed on a partition wall formed in the battery module, and a sliding groove corresponding to the sliding guides and an elastic hook hooked and fixed to the hooking jaw are formed in the case.

14. The apparatus for connecting between an electrode terminal of a battery module and a terminal of claim 13, wherein one side of an elastic plate of the elastic hook is fixed to the case and the other side thereof is extended in an opposite direction to a direction in which the case is coupled to the battery module to thereby be longer than the case and the partition wall, and the elastic plate has a protrusion part formed thereon to thereby be hooked and fixed to the hooking jaw of the partition wall.

15. An apparatus for connecting between an electrode terminal of a battery module and a terminal comprising:

a socket terminal having a plurality of elastic contactors extendedly formed at one side of a cylindrical body thereof so as to be spaced apart from each other by a predetermined distance in a circumferential direction and inserted onto and closely adhered to an outer side of the electrode terminal protruding from one side of the battery module;

a socket enclosing an outer side of the socket terminal and coupled to the socket terminal so as to be closely adhered thereto and having the terminal coupled to one side thereof; and a case coupled to the battery module to accommodate the socket, the socket terminal, and the terminal coupled to the electrode terminal therein and closely adhering the socket and the socket terminal to the electrode terminal in a direction in which the socket and the socket terminal are inserted onto the electrode terminal, wherein the electrode terminal and the terminal are electrically connected to each other by the socket terminal and the socket, and wherein the case has a fixing protrusion protruding at an inner side thereof, and the terminal has a cut part formed therein so as to correspond to the fixing protrusion, such that the terminal is closely adhered and fixed by the fixing protrusion.

* * * * *